United States Patent [19]

Cohen

[11] Patent Number: 4,889,421
[45] Date of Patent: Dec. 26, 1989

[54] CONTACT LENS WITH COSMETIC PATTERN

[76] Inventor: Allen L. Cohen, 10010 Walsham Ct., Richmond, Va. 23233

[21] Appl. No.: 252,190

[22] Filed: Sep. 30, 1988

[51] Int. Cl.$^4$ .............................................. G02C 7/04
[52] U.S. Cl. ................................................. 351/162
[58] Field of Search ............... 351/160 R, 160 H, 161, 351/162

[56] References Cited

U.S. PATENT DOCUMENTS 3,286,394 11/1966 Brudnay .......................... 351/162 X
4,704,017 11/1987 Knapp ............................. 351/162 X Primary Examiner—Scott J. Sugarman

[57] ABSTRACT

A cosemetic contact lens comprising an optically clear central visual region circumscribed by an area covering at least a portion of the iris, in which such circumscribing area comprises a moiré pattern.

16 Claims, 10 Drawing Sheets

Angle of Intersection

CONTACT LENS WITH COSMETIC PATTERN

BRIEF DESCRIPTION OF THE INVENTION

A cosmetic contact lens comprising an optically clear central visual region circumscribed by an area covering at least a portion of the iris, in which such circumscribing area comprises a moiré pattern.

BACKGROUND TO THE INVENTION

Tinted contact lenses have gained greater popularity as a result of the rise in the general acceptance of contact lenses, greater public sensitivity to personal appearance and improved contact lens structures (hard lenses vs. soft lenses vs. oxygen permeable lenses, etc.). Though the art illustrates a variety of manufacturing techniques for generating tinted or colored contact lenses little in the way of unique color patterns for tinted or colored lenses have been described in the art.

Colored contact lenses can be of two general categories. The first being contact lenses which use essentially transparent enhancement colors and allow the color of the natural iris to show through but combine with that natural color to produce a new appearance. Such tinted lenses might typically be used to turn a hazel eye to an aqua colored eye. This class of colored lenses may not be able to change an underlying dark colored, brown iris to blue. The second category is the opaque class of tinted lenses in which the color masks the natural iris color and presents a new color on the outside of the eye. This class of lenses is able to render a brown eye blue.

Wichterle, U.S. Pat. No. 3,476,499, patented Nov. 4, 1969, describes that

"It has also been attempted selectively to color hydrogel contact lenses by surface printing. An imprint on the exposed outer surface of the lens is unacceptable for reasons of appearance and it is very difficult to produce an imprint on the inner or contact surface of the lens which does not unfavorably affect the smooth surface finish necessary for avoiding irritation of the cornea."

Consequently, the patentee employs rotational molding to cause a precipitated light absorbing material in the polymerizable mixture to be distributed to an annular zone about the vision region of the lens. The patentee would appear to be solely concerned with achieving an appearance that attempts to simulate a normal iris to the wearer.

According to Foley, U.S. Pat. No. 4,252,421, patented Feb. 24, 1981: "One prior art method is to paint or print a colored central portion onto a soft contact lens using an implement such as a brush." Another technique involves "a chemical printing process for coloring soft contact lenses." Foley cites "several problems with the printing type of technique." They are: "the color is only printed on the lens after it has been manufactured and, therefore, is not uniformly dispensed through the lens material itself." "Water soluble dyes have also been used to provide the tinting." Foley employs water soluble dyes to tint that are polymer bound to the backbone of the polymerized comonomer mixture used to make the lens. In this respect, reference is made to Su, U.S. Pat. No. 4,468,229, patented Aug. 28, 1984, for another disclosure on the use of polymer bound dyes. Su states, at col. 7, lines 50-58:

"When it is desired to apply the dye to one surface only, or to specific portion of the surface, the prepared lens may be placed on a fixture or in a mold, and the reactive dyestuff formulation applied only to a specific portion or portions of the lens surface."

Foley, at col. 10, lines 51-60, describes two molding methods for making a tinted lens, and at col. 11, lines 24-33, a third method, which are discussed as follows:

"By the first method, the tinted button is polymerized first, placed in a mold and a hydrogel co-monomer mixture is poured around the periphery of the tinted button and polymerized. The second method is to polymerize the clear button initially and form a centrally positioned aperture through this clear button. The co-monomer mixture including the dye is then poured within this aperture and polymerized."

"A third method for forming the clear and tinted button combination is to form either a tinted or clear button of the normal soft contact lens blank size, slice this button in half and polymerize a comonomer mixture of the opposite type, i.e., tinted or clear, onto the originally formed button thereby forming a 'double layer' button with the lower portion of the button being tinted or clear and the upper portion being the opposite. In the cutting step the colored portion should be on the bottom so that the depth of cut used in forming the base curve will determine the diameter of the tinted area."

This patentee also demonstrates the desire to replicate the appearance of a normal iris.

Wichterle, U.S. Pat. No. 3,679,504, patented July 25, 1972, describes a number of techniques for making a colored molded contact lens. However, the patent fails to indicate a preference for a design on the lens other than artistically simulating the iris. Wichterle, Canadian Pat. No. 815,956, issued June 24, 1969, also describes techniques for making colored molded lens without characterizing a preference of design to be applied to the lens.

LeGrand, et al., U.S. Pat. No. 3,712,718, patented Jan. 23, 1973, describes a procedure of making a colored lens by cutting into an already shaped lens and filling the cut with the coloring material. The basic pattern described by the patent are striations.

Neefe, U.S. Pat. No. 4,472,327, patented Sept. 18, 1984, describes embedding light reflecting particles, such as mica or finely ground oyster shells, in the lens during molding.

Knapp, U.S. Pat. No. 4,582,402, patented Apr. 15, 1986, and U.S. Pat. No. 4,704,017, patented Nov. 3, 1987, describe the deposition of a single layer of colored dots on the surface of a contact lens in the iris area. The patents place dots about the iris section of the lens in the same manner, and for the same purpose, as the printer who makes a printing plate etched with dots or a laser printer that prints dots on a surface. If the plate has more dots per inch or the laser printer prints more dots per inch, the more continuous appearing the printed matter appears. Eventually the eye is incapable of discerning the empty space between the dots. This comes about in two ways. The eye is too far removed from the printed matter to distinguish between the dots or the dots are too close and too small for the eye, without magnification, to distinguish between the dots. Thus the patents draw upon an old art and artist trick ("pointillism"[1]) to simulate a continuous pattern on a surface. The patents use conventional printing with a soft pad which picks up the pattern from an etched plate and deposits the dot pattern onto the surface of the lens.

[1]. Webster's Third New International Dictionary, published by Merriam-Webster Inc., Springfield, Massachusetts U.S.A., defines "pointillism" as "the practice or technique of applying dots or tiny strokes of color elements to a surface so that when seen from a distance the dots or strokes blend luminously together"

Little mention appears in the art about the use of colored patterns in contact lenses which do other than attempt to effect a simulation of the pattern of the conventional iris, either by way of a plain repetitive pattern (the Knapp patents are an illustration) or an irregular pattern that trades on the underlying iris to provide texture and realism to the appearance effected through use of the lenses (the LeGrand patent is an illustration).

There is no art prior to this invention which addresses the use of patterns in the iris region of a contact lens that provides variability of design considerations unlike that of the natural iris yet can be used to effect the appearance of a natural eye. Such is one of the many objectives of the invention. There is no art prior to this invention that provides for contact lenses which, when worn, lend to the eye the appearance of a pattern distinctively different from the iris of a natural eye. Indeed, it has been the raison detre of the prior art to simulate the natural eye effect. However, unique iris cosmetics is another of the many objectives of this invention.

There is no art prior to this invention which utilizes a design for the iris section of a contact lens that relies on creating a visual illusion of a natural or unnatural iris design by the interaction of two separate and distinctive designs. The use of visual illusions is at the heart of this invention.

There is no art prior to this invention which utilizes a moiré pattern in a contact lens to provide a cosmetic effect. There is no art prior to this invention which utilizes lenslets in the iris region to effect a cosmetic effect. Both of these, i.e., moiré patterns and lenslets represent unique attributes of this invention in contact lenses.

There is no art prior to this invention which provides a contact lens with a posterior surface with a quasi-regular pattern, a body of physical thickness, and an anterior surface with a similar or different pattern, these patterns comprising solid and open arrangements with a slight angle relative to each other. Such constitutes another of the objectives of the invention.

The subject of moiré patterns has been addressed by Oster, et al., Scientific American, pages 1-11 (May 1963). In defining the requisites of a moiré effect, they state that "the only requirement for a moiré pattern is that the interacting figures have some sort of solid and open regions. The solid regions can be lines (straight, curved or wiggly), dots or any other geometric form." As a rule, moiré patterns are produced whenever two periodic structures are overlapped. Oster, et al. point out that a "moiré pattern can be regarded as the mathematical solution to the interference of two periodic functions". . .

It is offered that the moiré pattern or effect is best defined as at least two superimposed figures, at least one having some sort of transparent or semi-transparent or open regions through which one or more of the other figures may be at least partially viewed spatially separated or not, which interact so as to effect a different visual appearance, constituting the pattern, representing a visual illusion of both figures even though they have not physically changed. The figures may be of the same general shape, or vastly different; and they may have the same color or have different colors. The more varied the designs of the figures and/or the more varied the colors, the more complex will be the appearance or design of the moiré pattern, though one could imagine that a highly complex pattern and/or color combination could result in sufficient cancellation of effects that the appearance of the moiré pattern could end up looking quite simple. In the definition set forth in this paragraph, the term "illusion" deserves comment. In the context of moiré patterns, the illusion is a reflection of what the mind's eye perceives from the interaction of the figures. The resulting pattern caused by such interaction appears to a viewer as having a design, shape, color, repetitiveness and/or complexity which is/are unlike the individual figures which make up the pattern. In addition, a moiré pattern does not depend per se upon the incapacity of the eye to locate space between dots. It would, in the case of dots as the figures for generating the moiré pattern, trade upon the interaction of two separate layers of dots in space to generate the pattern and the eye would depend upon the space about the dots to generate the interaction necessary for the illusion of a moiré pattern.

Rowland, U.S. Pat. Nos. 3,357,772 and 3,357,773, patented Dec. 12, 1967, describes the use of lenslets in plastic materials for the purpose of generating unique visual moiré patterns. Rowland demonstrates that a moiré pattern can be generated from a combination of open figures and lenslets. The reflective effect of the lenslet combines with the open figures to generate the moiré pattern.

THE INVENTION

The invention comprises a cosmetic contact lens comprising an optically clear central visual region circumscribed by an area covering at least a portion of the iris, in which such circumscribing area comprises a moiré pattern.

The invention comprises a cosmetic contact lens comprising an optically clear central visual region circumscribed by an area covering at least a portion of the iris, in which such circumscribing area comprises at least two superimposed figures, the anterior figure having some visually transparent, semi-transparent or open regions, such as some sort of physically solid and open regions or visually-formed partially solid and open regions, spatially separated or not, which interact so as to effect a visual illusion constituting the pattern. The figures may be of the same general shape, or vastly different; and they may have the same color or have different colors. The more varied the designs of the figures and/or the more varied the colors, the more complex will be the appearance or design of the moiré pattern.

The invention relates to contact lenses which possess an iris portion, as aforedefined, which contains interacting figures which have some sort of solid and open regions. One embodiment of the invention, provides for a moiré effect obtained by the interference between two or more superimposed grid pattern layers of which the anterior layer comprises some transparent regions, and the grid pattern layers are affixed to or are part of a contact lens; or, most desirably, on both the upper and lower surfaces of a transparent contact lens such that the grid pattern layers are separated by the thickness of the lens allowing for maximum parallax to take place.

The moiré effect may be used to give a shimmering or glittering illusory metal image with movement and depth by virtue of parallax due to the physical separation of the two grid pattern layers. This phantasm of movement and depth can achieve startling visual effects. Moreover, the combination of motion, depth, and parallax that is provided by the grid patterns in the grid pattern layers provides a constantly changing, aesthetically pleasing pattern to the observer. When the grid patterns are provided in different colors, the resulting contact lens effect is seen as striking and unusual color patterns appearing both natural and lifelike or both unnatural and artificial. In any case, the appearance achieved in unique.

In a preferred embodiment of the present invention, the grid pattern layer positioned uppermost and closest to the observer may have its grid pattern optically formed or enhanced by the use of a patterned array of lenslets which image the grid pattern layer(s) positioned beneath it thereby providing an additional three-dimensional effect. In yet a further embodiment, these lenslets are utilized with a lower grid pattern layer comprised of mirrored concavities sufficient to effect reflected images and in particular the pattern in the upper layer. In the latter embodiment, the lenslet mirrors will have the capacity of reflecting ambient light of the lens wearers environment, lending additional colorations and visual complexity to the eye. Such would add sparkle and brightness to the appearance of the eye.

The present invention encompasses a contact lens comprising in the area thereof circumscribing the visual region:

a. a first grid pattern containing opaque or partially opaque regions;

b. a second grid pattern superimposed over the first grid pattern and containing opaque or partially opaque regions and transparent or partially transparent regions therein;

c. a primary substrate layer having an upper surface and a lower surface; wherein the first and second grid patterns visually interact with one another to form a moiré effect.

DETAILS OF THE INVENTION

This invention relates to a contact lens capable of imparting a color change or visual enhancement to the wearer's iris or a visually unique pattern to the appearance of the iris. It utilizes inter alias colored grid-like patterns spaced apart by the thickness of the contact lens itself and/or lenslets. The multiple patterns interact to produce an optical moiré effect. Furthermore, the body of the contact lens may act to separate the grid patterns and thereby allow for parallax between the grid patterns resulting in a moving or shimmering effect.

The present invention utilizes the fact that the illusion of movement and/or depth will greatly enhance the appearance of a cosmetic contact lens. As long as a combination of motion, depth, and or parallax is provided, striking and unusual color patterns can be made to appear natural and lifelike or unnatural and non-lifelike, depending upon artistic approach taken. Thus the invention provides an array of cosmetic options unlike any previously considered in a cosmetic contact lens.

This invention embodies at least two distinct advantages over the prior art. Firstly, it provides a visually unique appearance in almost all designs, yet the designs are relatively easy to produce on the contact lens. Secondly, it can be made to effect a constantly changing, aesthetically pleasing pattern which has the elements of motion, depth, color change and even three-dimensionalism.

with a very natural appearing pattern with much or all of the complexities of tone and texture of a natural iris.

with the ability to impart the illusion of movement, or alternation in pattern, to an iris with patterns exhibiting one or more colors that are different from the colors of the figures making up the patterns with the ability to create patterns exhibiting the illusion of depth.

The invention aims for a cosmetic contact lens wherein the desired cosmetic property materializes as the result of interference between two or more open patterns which are either physically or optically generated, which may or may not be spaced apart by the body of the contact lens so as to allow for parallax.

A grid pattern can be as simple as a set of uniformly spaced lines or curves, but may be any periodic or quasi-periodic geometric pattern of solid and open regions. The necessity for open regions in at least the anterior pattern is dictated by the need to observe a posterior grid pattern through a superimposed anterior grid pattern. It is of course well known that such superimposed grid patterns will give rise to moiré-0 patterns.

If the grid patterns are separated by the thickness of, for example, the carrier body of a contact lens, the relative phase between the two grids will depend upon the angle of view. Hence, as an observer moves with respect to the contact lens, parallax will change the relative phase between the two grids resulting in a changing or 'moving' moiré pattern.

Figure 1:
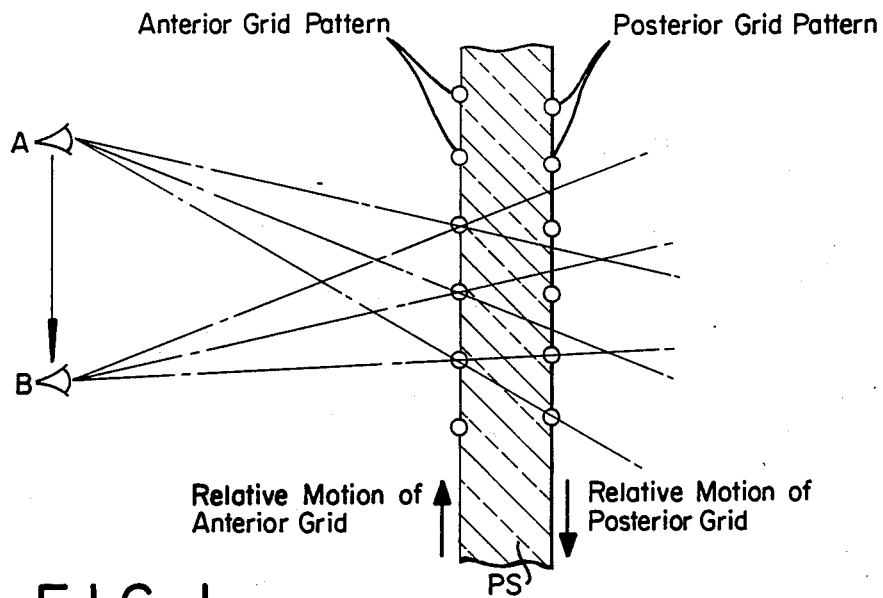
FIG. 1 shows a cross-sectional view of a moving eye observing an anterior and posterior grid pattern separated by a physical space PS.

This is illustrated in FIG. 1, where an eye is shown observing an anterior and posterior grid pattern. As the eye moves from position A to position B, the anterior grid appears to move in a direction opposite the motion of the eye with respect to the posterior grid.

In a preferred embodiment of the invention, a physical space is provided between the two or more grid patterns. The necessary thickness of this space, to allow for the effect of movement, is related to the periodicity of the grid patterns themselves. For grid patterns with wide lines and large spacing, a large physical thickness between the grid patterns in desirable. For small grid spacing, a small thickness separation will typically suffice. In general, a useful movement effect is achieved whenever the measurement of the separation thickness is at least as large as the measurement of a set of the grid pattern periodicity.

The grid pattern may have such a fine pattern, i.e., the grid line are extremely fine and close to one another, that the individual opaque areas of the grids are indistinguishable from one another when viewed at a small distance from the eye by another. For example, the grid pattern can be so fine that at a distance of about 3 to about 6 feet, a person with 20/20 vision would be unable to distinguish between the components of the grid pattern. Even though the components of the grids are not resolvable, the moiré pattern and the effect of movement is not lost. For example, one may use line or dot patterns with widths and spacings as small as about 0.01 millimeter (mm) to about 0.10 millimeter (mm). In some cases, such patterns will be preferred over larger widths and spacings.

Figure 2:
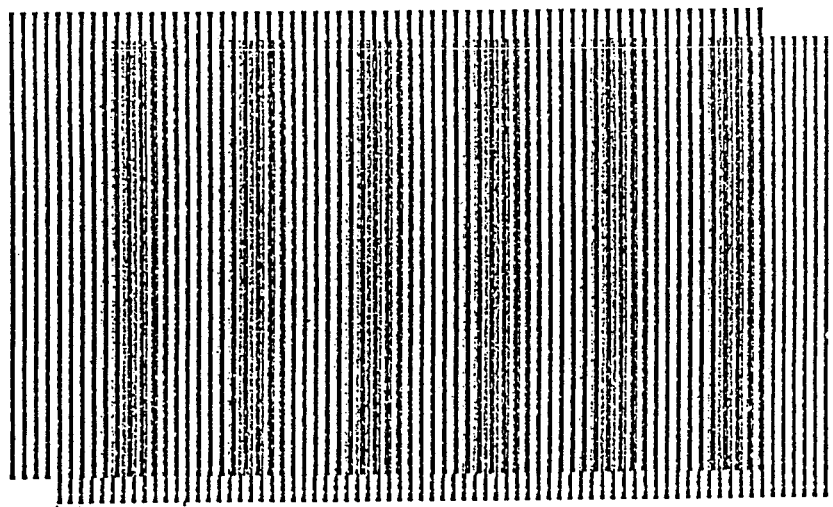
FIG. 2 shows a moiré beat pattern formed by superimposing two parallel line grids of slightly different periodic spacing frequencies.

The simplest moiré pattern arises from the superimposition of two sets of parallel lines. When the spacing of one set differs from that of the other, and the lines are not wide enough to fill a space, one will observe a beat as shown in FIG. 2. This beat is the result of an apparent broadening of the lines as the two grids move out of phase. The more closely the grid spacings match, the further apart are the resulting beats. Small changes in the relative grid spacings will produce large changes in the spacing of the moiré beats.

In FIG. 2, not only is the illustrated moiré pattern resolvable to the naked eye, but the individual grid patterns are similarly resolvable. However, it is clear that the moiré pattern may remain resolvable even when the individual grid patterns are so fine as to be unresolvable to the naked eye. For example, if the partially opaque colored parallel grid lines have a reflectance of 80%, and the semi-transparent open regions have a reflectance of 20%, then the resulting grid patterns will have an average reflectance of $(80+20)/2=50\%$. And if the grid lines are so closely spaced so as to be unresolvable, each grid pattern will simply appear as a uniformly colored solid region with a reflectance of 50%. The moiré pattern, however, will exhibit broad resolvable alternate colored brands of 80% and 50% reflectance respectively.

Figure 3:
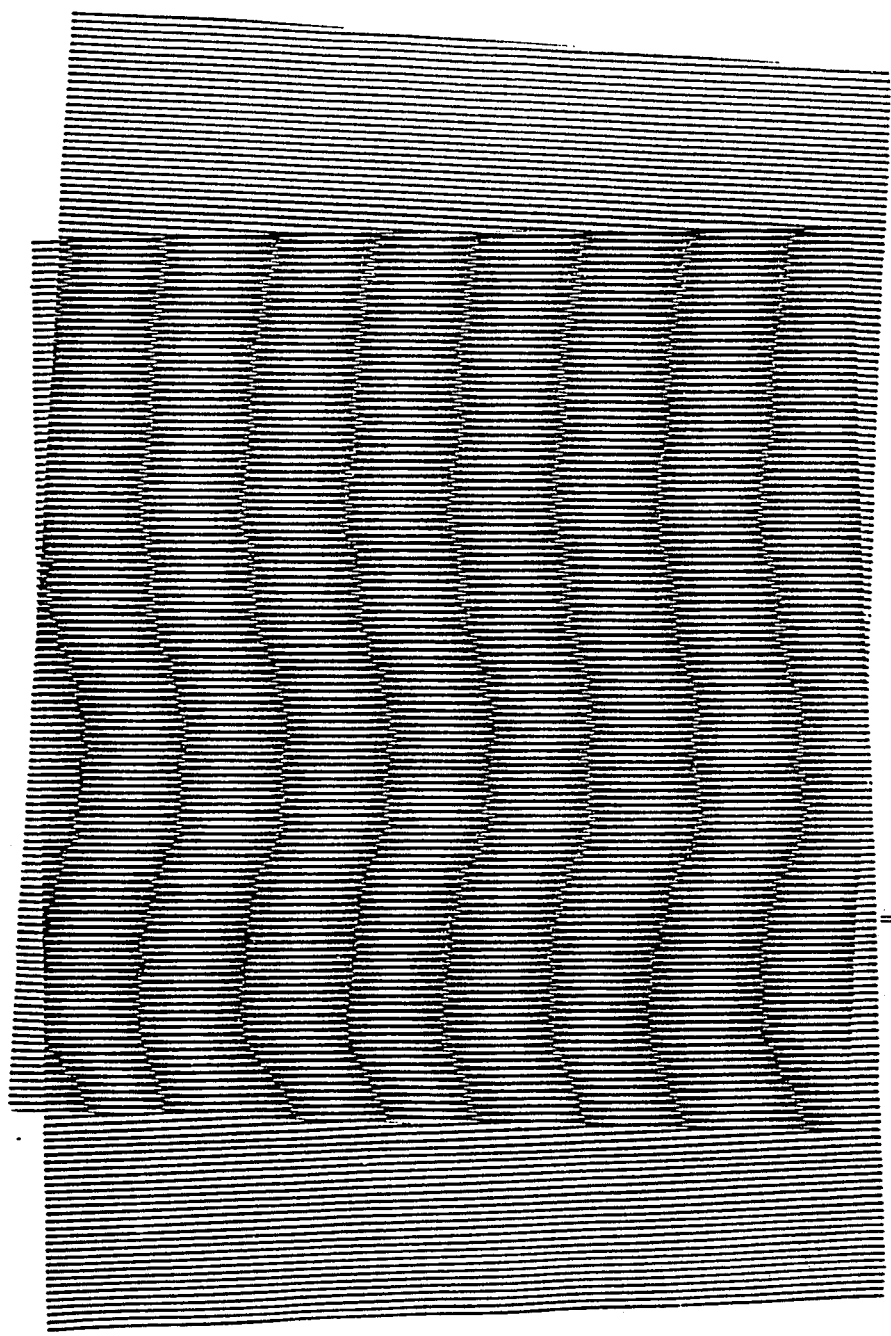
FIG. 3 shows a moiré pattern formed by superimposing two identical parallel line grids aligned with a slight angle relative to each other.
Figure 4:
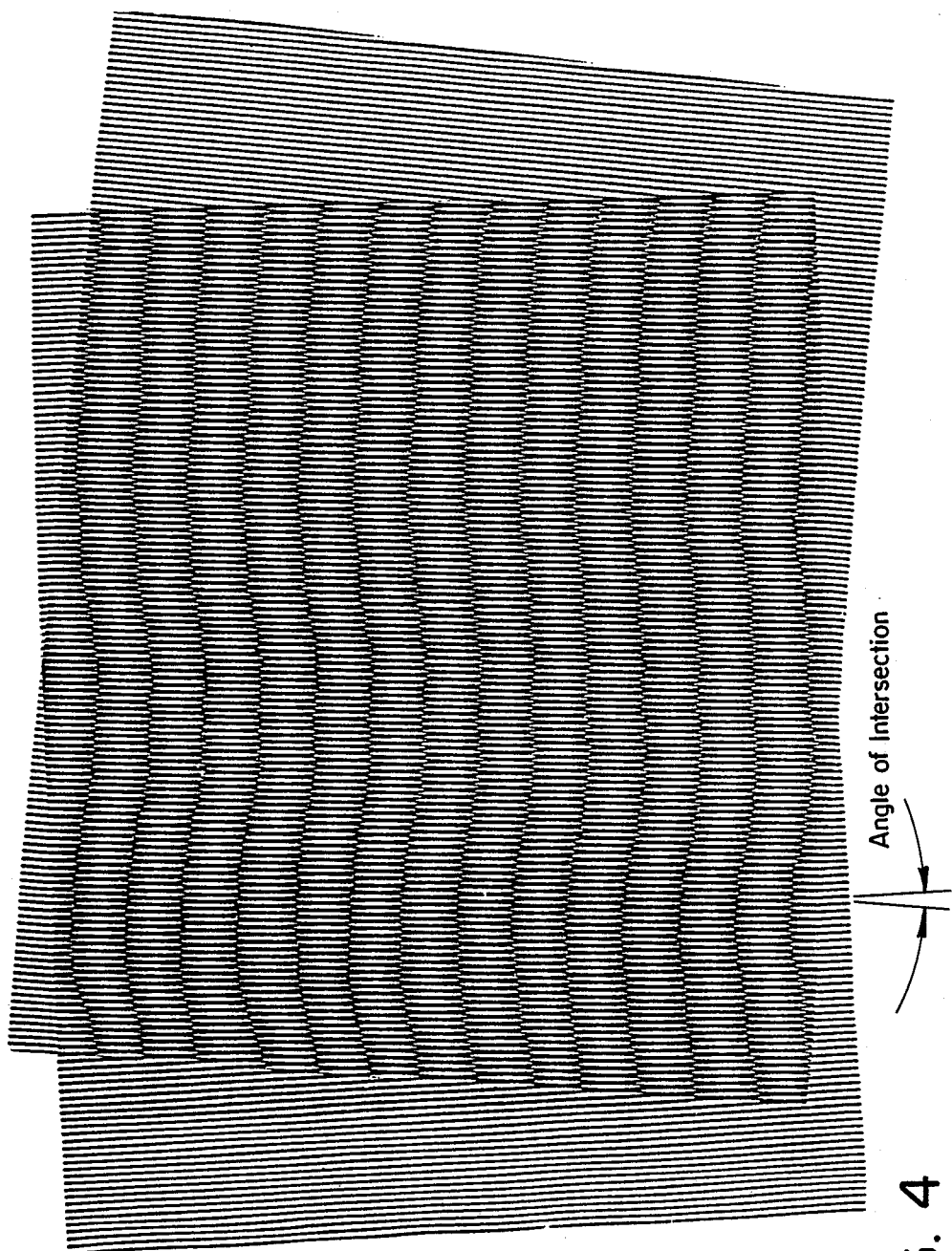
FIG. 4 shows a moiré pattern formed by superimposing two identical parallel line grids aligned with a moderate angle relative to each other.

Causing the parallel line grids to intersect at a small angle will result in a set of moiré lines, as shown in FIG. 3, that are approximately perpendicular to the grid lines themselves. A larger angle of intersection, as shown in FIG. 4, will result in a more closely spaced set of moiré lines. Small changes in the angle of intersection will produce large changes in the spacing of the moiré fringes.

These magnification effects can be used to create any desired amount of apparent motion. If one moves two grids of slightly differing periodicity and or relative orientations slowly with respect to each other, there will be observed a moiré pattern that moves much faster than the grid patterns themselves. The more motion that is desired, the closer should be the periodicity and alignment of the grid patterns, and of course, less motion requires less periodicity and less alignment of the grid patterns.

Figure 5:
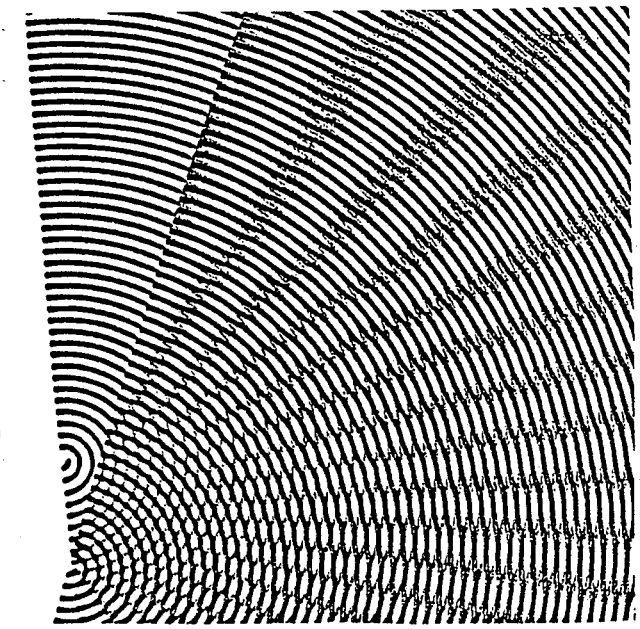
FIG. 5 shows a moiré pattern formed by superimposing two circular grid patterns.
Figure 6:
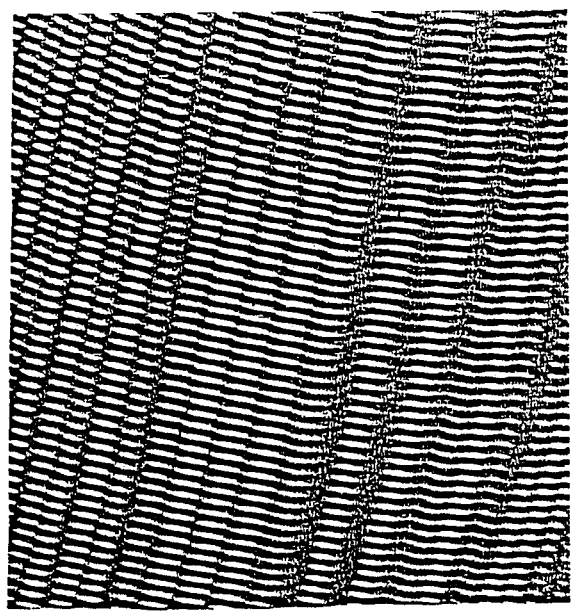
FIG. 6 shows a moiré pattern with a very natural and realistic appearance.

FIG. 5 shows that circular grid patterns introduce additional complexity to moiré patterns. Such simple grid patterns tend to generate highly repetitive geometric forms. In fact, use of grids with quasi-random patterns generates very complex moiré patterns that look natural and lifelike. An example of such a moiré pattern is shown in FIG. 6. The combination of a natural appearing moiré pattern, with movement introduced by parallax is an important feature of this invention.

The complex pattern of FIG. 6, utilizing circles and parallel lines, also introduces a color effect. For example, if the grid patterns comprise opaque blue inks, there will appear areas of red-brown hues in the resulting moiré patterns. This color phenomenon is based on the principle of complementary colors and retinal bleaching. Whenever one observes regions of sharply contrasting colors, small eye movements will lead to appearance of reverse patterns and complementary colors.

An additional improvement in cosmetic appearance can be gained by the addition of depth. This is achieved by optically imaging one of the grids to an image position behind or in front of the actual grid pattern planes. Such imaging requires the use of lenslet arrays. The underlying physics is well known and has been described in detail by R. de Montebello in U.S. Pat. No. 3,503,315 and in this paper entitled "The Integram System", SPIE Vol. 120 Three Dimensional Imaging, 1977.

Figure 7A:
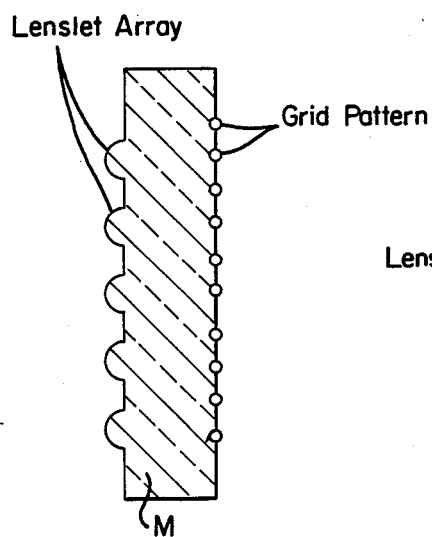
FIG. 7a shows a cross-sectional view of an optically transparent material M, with a front surface comprising an array of lenslets, and a posterior surface upon which a grid pattern is printed.

FIG. 7a shows a cross-sectional view of an optically transparent material M, with a front surface comprising a patterned lenslet array. The principles of lenslets are illustrated in FIG. 7a, which shows a side view of an optically transparent material M. On the back surface is a posterior grid pattern, while the front surface comprises an anterior lenslet array. The lenslet array may be in the form of an identical, similar, or different patterned arrangement and give rise to a shimmering illusion with movement of the wearer or observer by virtue of parallax due to the physical separation of the two patterns. The individual lenslets should have focal lengths of the same order of magnitude as the thickness t separating the lenslets and the posterior grid pattern. Such focal lengths should be no less than one-tenth the thickness t, nor should they be any larger than ten times the thickness t.

Since the posterior grid pattern will phase in and out of alignment with the anterior lenslets, the optical images will take on the characteristic moiré patterns. In the case with the use of lenslets, the moiré pattern will exhibit the added characteristic of depth. The moiré pattern may appear to stand out in front of the lenslet array, or it may appear to be located behind the lenslet array, depending on the specific configurations of the lenslets, their focal lengths, and the grid spacings.

Figure 7B:
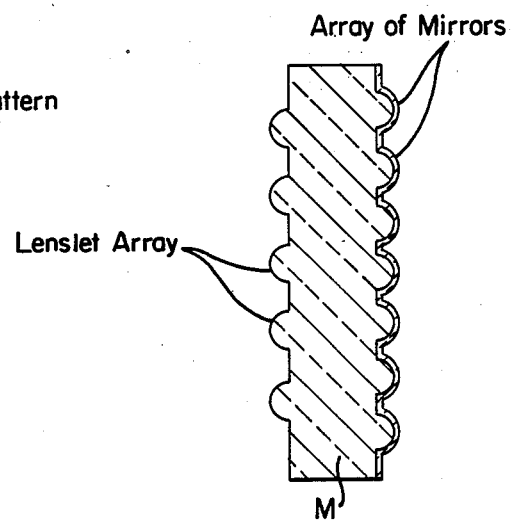
FIG. 7b shows a cross-sectional view of an optically transparent material M, with a front surface comprising an array of lenslets, and a posterior comprising an array of concave mirrors.

In addition, the posterior grid pattern may be in the form of an array of opaque multicolored concavities as discussed by H. E. Ives in U.S. Pat. No. 1,918,705. The posterior grid pattern may be in the form of an array of concave mirrors. This is illustrated in FIG. 7b. The same theory applies to this configuration, which has been explained by Rowland, supra. The moiré effects materialize as the anterior lenslet array phases in and out of registration with the posterior mirror array. Again, because of the optical imaging in this configuration, the resulting moiré pattern takes on a three dimensional effect or appearance.

Figure 8A:
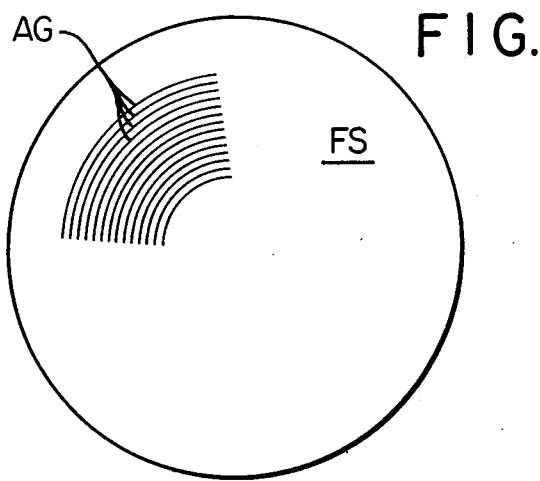
FIG. 8a shows a front view of the front surface FS of a cosmetic contact lens according to one embodiment of the invention. The anterior grid AG is also shown.
Figure 8C:
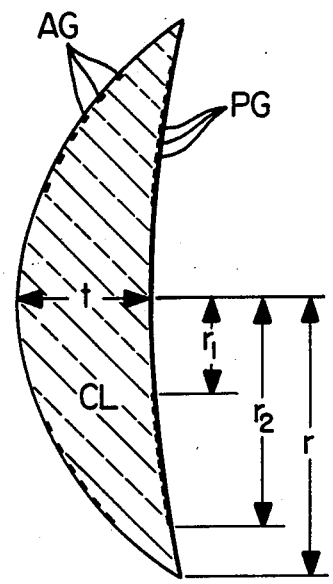
FIG. 8c shows a cross-sectional view of the contact lens CL according to the embodiment of FIGS. 8a and 8b.
Figure 8B:
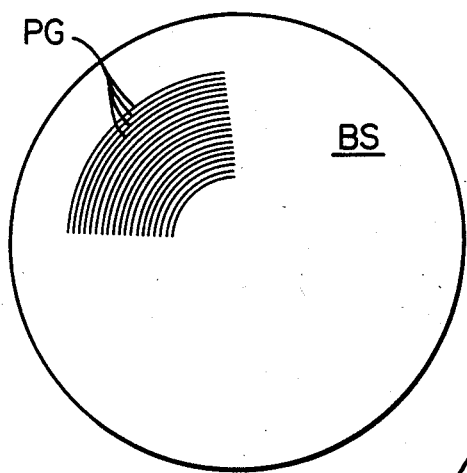
FIG. 8b shows a front view of the back surface BS of the cosmetic contact lens of FIG. 8a. The posterior grid PG is also shown.

In the embodiment of the invention as shown in FIGS. 8a, b, c and d, there is illustrated front view in FIGS. 8a, b and d and a cross-sectional side view in FIG. 8c. FIG. 8a shows the front surface FS of the cosmetic contact lens CL. An annular region within the front surface FS is shown to comprise the anterior grid pattern AG, which itself contains a series of about 200 concentric light blue circles each approximately 0.005 mm wide and spaced about 0.010 mm apart. FIG. 8b shows the back surface BS and the annular posterior grid pattern PG. The posterior grid pattern PG comprises about 300 concentric dark blue circles approximately 0.005 mm wide and spaced approximately 0.005 mm apart.

Figure 8D:
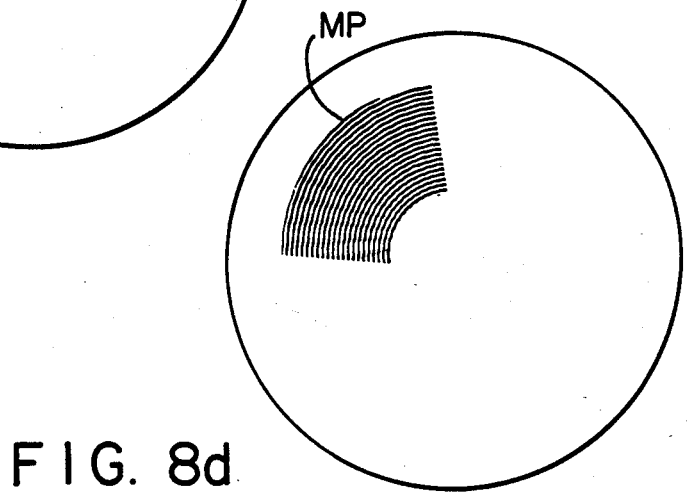
FIG. 8d shows a front view of the cosmetic contact lens according to the embodiment of FIGS. 8a, 8b and 8c. The resulting moiré pattern MP is also shown.

FIG. 8c shows that the contact lens, which may or may not have optical prescription, has a central thickness $t=0.12$ mm, a radius $r=7.0$ mm, with the grid patterns confined to the annular region bounded by the radii $r=3.0$ mm and $r_2=6.0$ mm. FIG. 8d shows a front view with the resulting moiré pattern$^2$ MP. This moiré pattern will of course present a shimmering appearance to any observer as the observer changes the visual angle focused on the lens, i.e., his viewpoint.

Figure 9A:
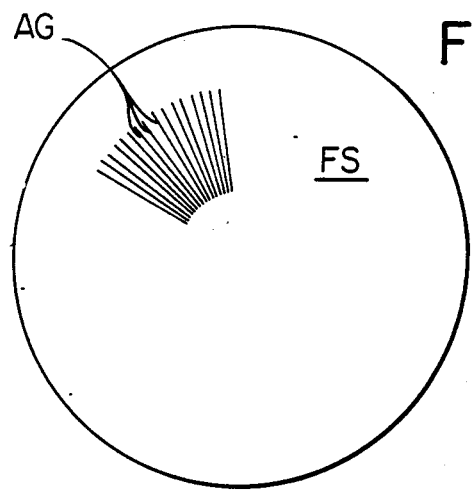
FIG. 9a shows a front view of the front surface FS of a cosmetic contact lens according to another embodiment of this invention. The anterior grid AG is also shown.
Figure 9C:
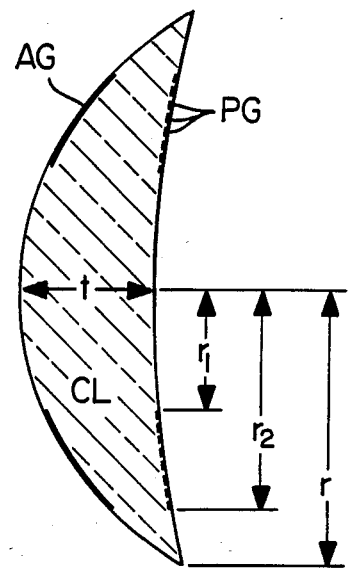
FIG. 9c shows a cross-sectional view of the contact lens CL according to the embodiment of FIGS. 9a and 9b.
Figure 9B:
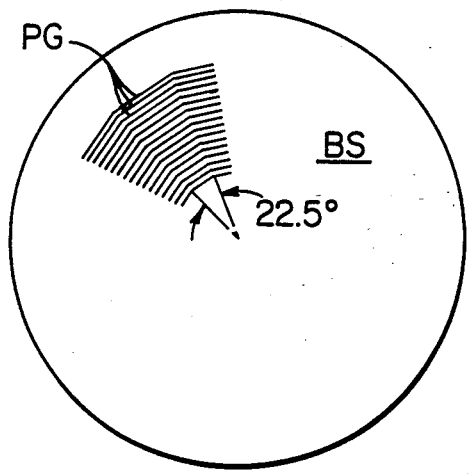
FIG. 9b shows a front view of the back surface BS of the cosmetic contact lens of FIG. 9a. The posterior grid PG is also shown.

In the embodiment of the invention as shown in FIGS. 9a, b, c and d, FIGS. 9a, b, and d provide front views whereas FIG. 9c shows a cross-sectional side view. In FIG. 9a, the front surface of the cosmetic contact lens CL is designated FS and the annular region within the front surface FS is shown to comprise the anterior grid pattern AG, which itself comprises a series of about 2000 radial brown lines approximately 0.005 mm wide and spaced approximately 0.003 radians apart. FIG. 9b shows the back surface BS and the annular posterior grid pattern PG. The posterior grid pattern PG comprises about 300 parallel light green lines approximately 0.005 mm wide and spaced approximately 0.005 mm apart. These parallel lines are taken to fill 16 pie wedge regions of 22.5 degrees each.

Figure 9D:
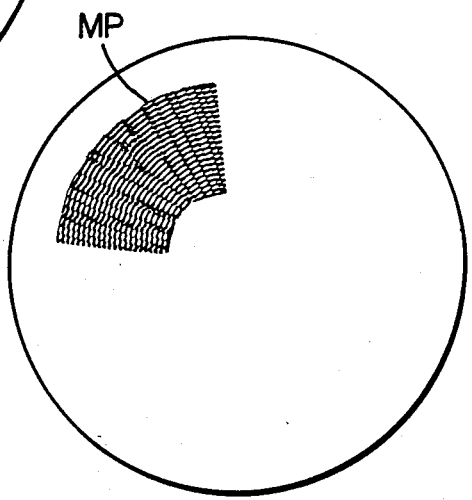
FIG. 9d shows a front view of the cosmetic contact lens according to the embodiment of FIGS. 9a, 9b and 9c. The resulting moiré pattern MP is also shown.

FIG. 9c shows a contact lens, which may or may not have optical prescription, that has a central thickness $t=0.08$ mm, a radius $r=7.0$ mm, with the grid patterns confined to the annular region bounded by the radii $r_1=3.5$ mm and $r_2=6.5$ mm. FIG. 9d shows a front view of the resulting moiré pattern MP which presents a varied and shimmering colored appearance to any observer as such observer changes his viewpoint.

Figure 10A:
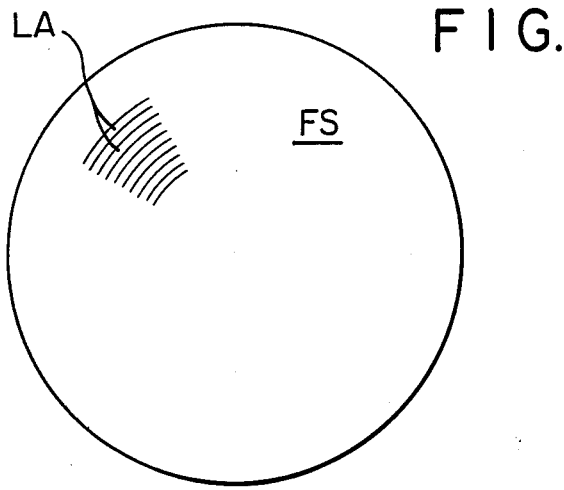
FIG. 10a shows a front view of the front surface FS of a cosmetic contact lens according to another embodiment of this invention. The lenslet array LA is also shown
Figure 10C:
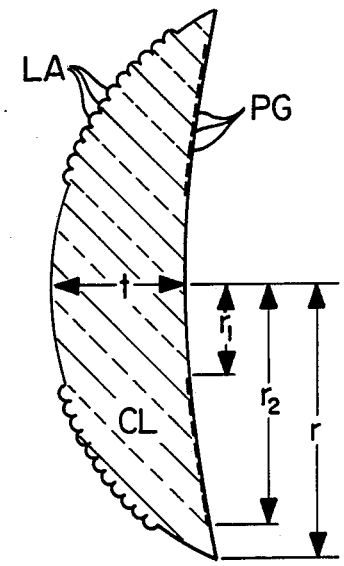
FIG. 10c shows a cross-sectional view of the contact lens CL according to the embodiment of FIGS. 10a and 10b.

In the embodiment of the invention as shown in FIGS. 10a, b, c and d, FIGS. 10a, b and d illustrate front views and FIG. 10c illustrates a cross-sectional side view. In FIG. 10a the front surface FS of the cosmetic contact lens CL has an annular region within it which comprises the anterior lenslet array LA, which itself comprises a series of about 150 concentric cylindrical lenslets. Each lenslet in this embodiment has a radius of curvature R of about 0.01 mm, while the contact lens CL has a refractive index of $\eta=1.44$ and the tear layer expected to cover the front surface of the contact lens has a refractive index of $\eta'=1.33$. This combination of features given each lenslet a focal length of $f=\eta R/(\eta-\eta')=0.13$ mm.

Figure 10B:
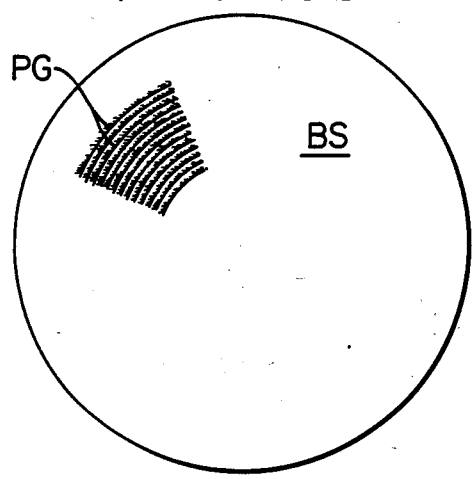
FIG. 10b shows a front view of the back surface BS of the cosmetic contact lens of FIG. 10a. The posterior grid PG is also shown.
Figure 10D:
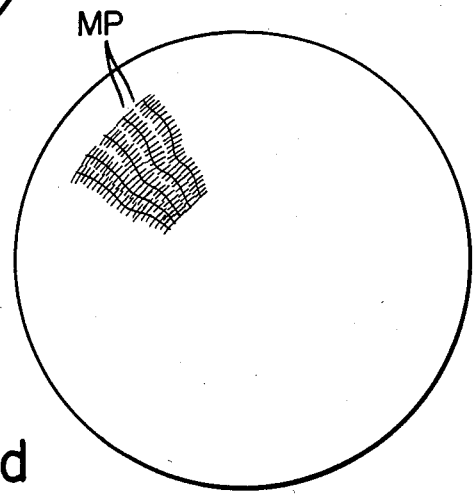
FIG. 10d shows a front view of the cosmetic contact lens according to the embodiment of FIGS. 10a, 10b and 10c. The resulting moiré pattern MP is also shown.

FIG. 10b shows the back surface BS and the annular posterior grid pattern PG. The posterior grid pattern PG comprises about 300 concentric blue circles approximately 0.005 mm wide and spaced approximately 0.005 mm apart. FIG. 10c illustrates a cross-sectional side view. The contact lens has a central thickness $t=0.08$ mm, a radius $r=6.5$ mm, with the grid patterns confined to the annular region bounded by the radii $r_1=3.2$ mm and $r_2=6.2$ mm. FIG. 10d provides a front view with the resulting moiré pattern MP.

Figure 11:
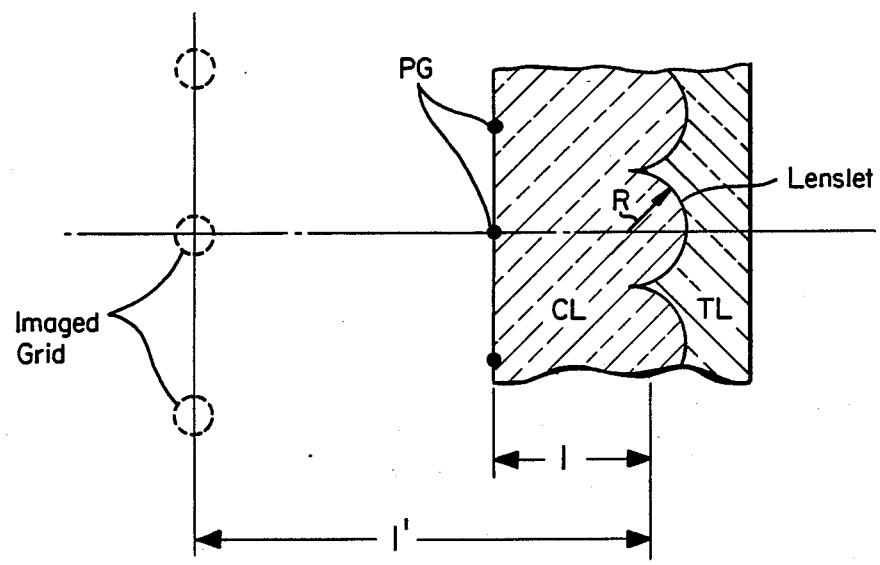
FIG. 11 diagrams the optics of the embodiment of FIGS. 10a–d.

This moiré pattern will also present a shimmering colored appearance to any observer as such observer changes his viewpoint. But in addition there will be the added illusion of depth. FIG. 11 illustrates a single lenslet of the contact lens CL, imaging the posterior grid PG into the final imaged grid. This imaged grid lies behind the actual posterior grid PG. Of course both the lenslet array and the imaged grid will be further imaged through the tear layer to the image plane where the final moiré pattern will appear.

An effort has been made to characterize the position of imaged grid to a viewer looking from the tear layer TL of the lens of FIG. 11. Letting $l'$ represent the position of where the image will be, $l$ represent the position of the object relative to the position of the lenslet (in this case 0.08 mm), R be the radius of curvature of the lenslet with a value of $-0.1$, $\eta'$ the index of refraction of the tear layer having a value of 1.33, $\eta$ the index of refraction of the lens CL having a value of 1.44, and $\eta_0$ the index of refraction of air having a value of 1.0, there is obtained the following:

$$\eta/l' = \eta/l + (\eta' - \eta)/R$$

$$1.33/l' = 1.44/(-0.08) + (1.33 - 1.44)/-0.01$$

$$1.33/l' = -18 + 11 = -7$$

$$l' = 1.33/(-7) = -0.19 \text{ mm}$$

Figure 12A:
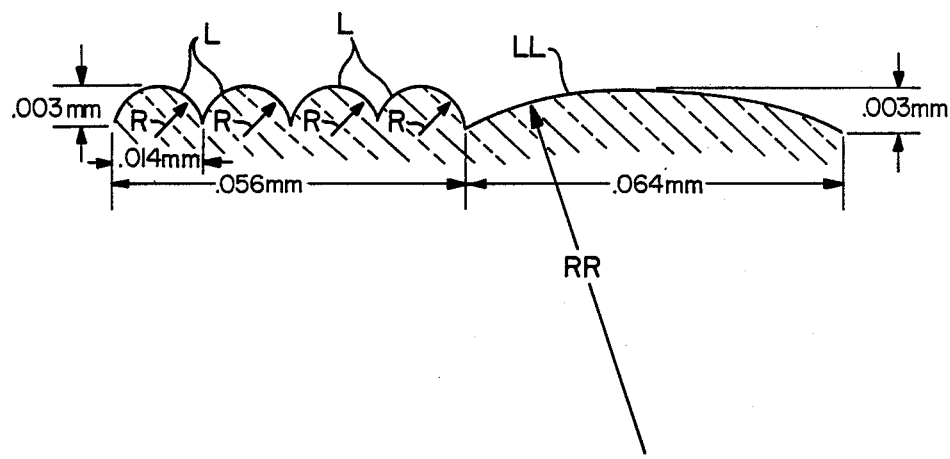
FIG. 12a shows a cross-sectional view of a portion of the lenslet array on the front surface of a contact lens of another embodiment of the invention.

In another embodiment of the invention, FIG. 12a illustrates a cross-sectional side view of a slightly more complex lenslet array on the front (anterior) surface of a contact lens similar to the contact lens of FIG. 10c. However, in this embodiment the lenslet array contains a repetitive grouping of four lenslets L, each lenslet having a radius R=0.01 mm, and one lenslet LL of radius RR=0.18 mm. The chord length of the small lenslet L, at their point of intersection is set to be about 0.014 mm, while the chord length of the larger lenslet LL is taken to be approximately 0.064 mm.

Figure 12B:
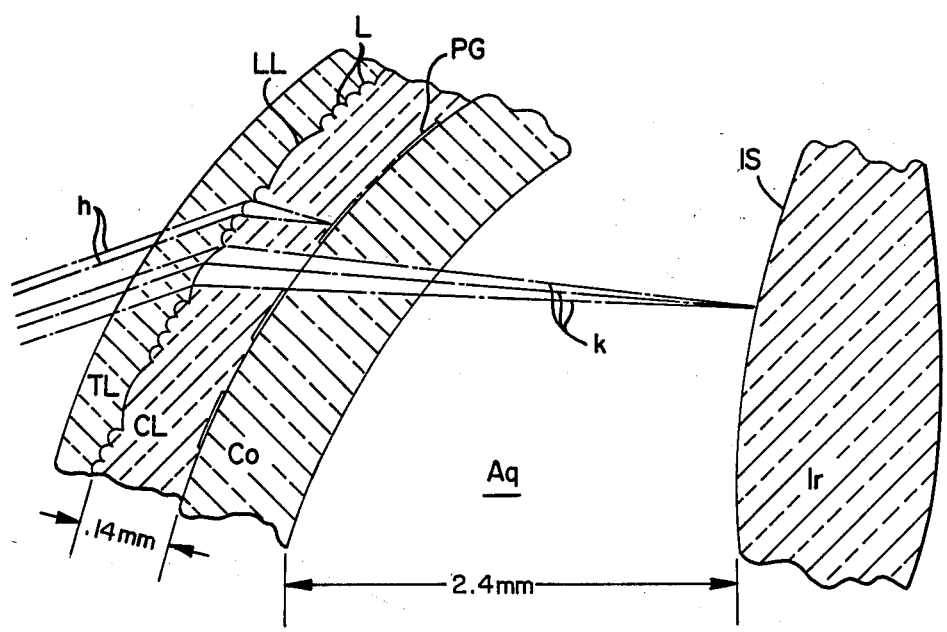
FIG. 12b shows a cross-sectional view of a portion of the contact lens of FIG. 12a, being worn on an eye, and the associated optics.

In FIG. 12b, the small lenslets L are designed to have a focal length approximately equal to the thickness of the contact lens CL which is taken to be about 0.14 mm. The large lenslets LL are designed to have a focal length approximately equal to the setback of the iris Ir which is taken to be about 2.4 mm. These focal lengths have been calculated by taking into account the indices of refraction $\eta_1 = 1.336$ of the tear layer TL, $\eta_2 = 1.44$ of the contact lens CL, $\eta_3 = 1.366$ of the cornea Co, and $\eta_4 = 1.336$ of the aqueous Aq.

Also shown in FIG. 12b is the cross-sectional view of the posterior grid pattern PG, comprising a series of opaque violet colored concentric annular rings of width 0.05 mm. These opaque annular rings are spaced apart by transparent annular rings also of width 0.05 mm. In this FIG. 12b are a set of light rays k, leaving the surface IS of the iris Ir, and being collimated into a beam of light by a lenslet LL. Similarly, another set of light rays h leave an opaque point of the posterior grid PG and are collimated into a beam of light by a lenslet L.

An interesting variation on the embodiment of FIGS. 12, would be realized by replacing the opaque annular rings PG, with annular rings each of which comprises a set of 50 concentric ruled grooves of 1 micron widths. In this embodiment, the posterior grid PG is actually a grid of circular diffraction gratings. The resultant cosmetic contact lens will exhibit a sparkling iridescence.

Figure 13A:
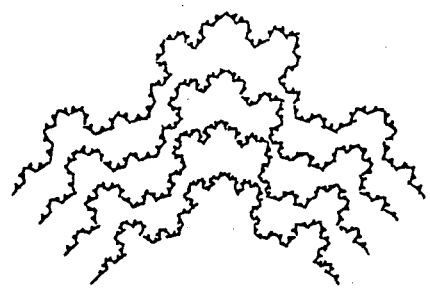
FIG. 13a shows a posterior grid pattern utilizing fractal geometry.

The grid patterns of the various embodiments may be simple or complex. The final effect however, may realize a very natural looking moiré pattern. An interesting example of one of the techniques that may be used to achieve such a result is shown in FIG. 13a of a grid pattern utilizing Koch's snowflake curve. This is but one of many possible complex fractal designs. Such designs have a basic regularity which is necessary for our moiré effect, and yet they also display a quasi-randomness which is necessary for a natural appearance. Using this pattern as the posterior grid pattern PG in the embodiment of FIG. 10 gives yet another embodiment of this invention.

Figure 13B:
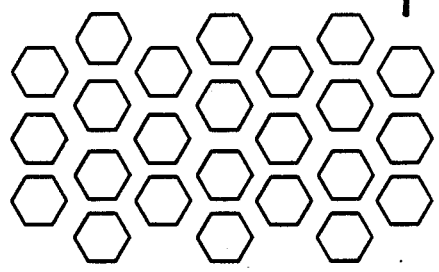
FIG. 13b shows a grid pattern utilizing hexagonal spots.
Figure 13C:
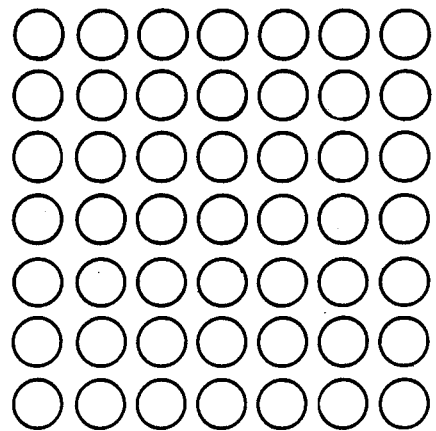
FIG. 13c shows a grid pattern utilizing circular spots.

Nevertheless, such complex grid patterns are not at all necessary; in fact, using the simple hexagonal dot pattern of FIG. 13b, for both the anterior grid AG and the posterior grid PG of the embodiment of FIG. 8 yield an entirely new embodiment. By employing the simple circular dot pattern of FIG. 13c, for both the anterior grid AG and the posterior grid PG of the embodiment of FIG. 9, another embodiment of the invention is obtainable.

All of the values in the above embodiments, are of course, only for the purpose of illustrating a particular embodiment and are not to be construed as restrictive of the scope of the invention.

The moiré pattern can be placed on the lens by a variety of printing procedures. In fact, the pattern could be painted on the lens surfaces with a brush. Obviously, in the commercial manufacture of the lens, it is more desirable to print the pattern onto the lens using well known and understood automated techniques, such as by transfer printing from an etched plate of the pattern using a soft rubber pad, such as one made of polydimethylsiloxane rubber, and equivalent materials. The pattern may be created on the lens surfaces with an air brush, or by ink jetting, and the like methods of coating. An interesting way of doing the coating is inject the liquid colored material from a die having a face that conforms to the shape of the lens's surface being coated and possessing holes in the face configuring to the iris section on the mold's surface. The holes replicate the pattern to be coated on the lens surface. The die can be dropped to the surface of the lens like a date stamper, and the pressure on the die face can be used to force the colored material out of the die onto the lens.

The colored liquid used to form the pattern of the lens surface typically comprises a vehicle and a colorant. The vehicle involves a thermoplastic coating material or a curable coating material provided in liquid form. The coating materials are per se liquid or rendered liquid by the use of a solvent or diluent. The vehicle may comprise a multiphase composition such as a dispersion of the coating material in a diluent such as water. A latex or emulsion is an illustration of this. The colorant may be any of the conventional reactive and non-reactive dyes in the art or taught by the art for use in tinting contact lens and the various pigmentary materials used by the art and coating industry. It is desirable that the coating material have the capacity of taking or accepting autoclaving conditions employed by the art for the sterilization of the lens. For example, it would be desirable that the coating material, when part of the final contact lens be able to effectively pass 150° C. autoclaving for about 5 to about 30 minutes. The colorant blended with the resin and in the final contact lens is desirably resistant to removal by lachrymal liquids or cleansing and bactericidal agents used to treat the lens in typical usage.

The vehicle of the colored liquid can be a thermoplastic or curable. It is desirable to make the liquid by blending a colorant of choice into a plastic or resin while provided in liquid form in the usual fashions known to the art. The plastic may be the usual thermoplastic materials that are used in coatings, such water borne latex coating systems based upon acrylic resins, vinyl acetate resins, copolymeric resins containing acrylics or vinyl acetate. The acrylic resins are based upon homopolymers and copolymers of acrylates and methacrylates such as methyl acrylate, ethyl acrylate, 2-ethylhexyl acrylate, and the like, methyl methacrylate, n-propyl methacrylate. The vinyl acetate resins are homopolymers and copolymers derived from vinyl acetate. Of course, the plastic may be in a wholly organic solvent borne system rather than in a water borne latex (it is recognized that the typical latex possesses the plastic or resin dissolved in an organic solvent, the resultant solution is dispersed in water and the dispersion is maintained by the use of surface active agents).

Another resin that one may employ is of the curable type. Those resins may be classed as thermosetting insofar as they are not capable of being rendered thermoplastic. Of the resins of this type, and there are many that one could use in the practice of the invention, the most desirable are those that are either compatible with the liquid lens-forming mixture or are the same as the liquid lens-forming mixture. In this case, the colored film is deposited onto the lens surface as a liquid and may be subjected to a partial or total cure. The resin when coated as a liquid to the surface may be in the A or B-stage, that is, without any level of cure (A-stage) or partially cured but still liquid (B-stage). When the coating on the lens is in the A-stage, it is desirable to subject it to some curing to convert it to the B-stage before handling the lens and preferably resins applied in the A- or B-stages are converted to the C-stage before the lens in subjected to normal handling.

The contact lenses of the invention are desirable made of plastics, and they may be formed by any of the known procedure, including lathing, casting and spin casting. Compositions and molding procedures useful in the practice of the invention are described in U.S. Pat. No. 4,568,501, U.S. Pat. No. 4,626,388 and U.S. Pat. No. 4,534,916, O. Wichterle, and U.S. Pat. No. 4,121,896 and U.S. Pat. No. 4,208,364 to T. H. Shepherd.

Lenslets may be formed according to the teachings of Rowland, supra, see in particular U.S. Pat. No. 3,357,772, and Ives, U.S. Pat. No. 1,918,705, patented July 18, 1933. They may be configured into the structure of the mold used to cast the contact lens of the invention and by casting the lens with a male or female mold containing male or female depressions suitable for generating lenslets in the contact lens made in such a mold.

I claim:

1. A cosmetic contact lens comprising an optically clear central visual region circumscribed by an area covering at least a portion of the iris, in which such circumscribing area comprises at least two superimposed figures, separated by at least some portion of the contact lens body, with at least the anterior figure having transparent, semi-transparent or open regions, which interact so as to effect a visual appearance, constituting the pattern, representing an apparent illusion of both of them even though the figures have not physically changed.

2. The cosmetic lens of claim 1 wherein the figures are physically solid and open regions or visually-formed solid and open regions.

3. The cosmetic lens of claim 1 wherein the figures are of the same or generally the same shape.

4. The cosmetic lens of claim 2 wherein the figures are of the same or generally the same shape.

5. The cosmetic lens of claim 1 wherein the figures have the same color or have different colors.

6. The cosmetic lens of claim 2 wherein the figures have the same color or have different colors.

7. A cosmetic contact lens which contains an iris region which provides for a moir',acu/e/ effect obtained by the interference between two or more superimposed grid pattern layers therein where the superimposed grid pattern layers are located on opposite surfaces of a transparent contact lens such that the grid pattern layers are separated by the thickness of the lens allowing for maximum parallax to take place.

8. The cosmetic lens of claim 7 wherein the grid patterns are of the same or generally the same shape.

9. The cosmetic lens of claim 7 wherein the grid patterns are the same or different colors.

10. A cosmetic contact lens comprising an optically clear central visual region circumscribed by an area covering at least a portion of the iris, in which such circumscribing area comprises:
    (a) a primary substrate layer, forming the body of the contact lens that is transparent or partially transparent and has an upper surface and a lower surface, said surfaces separated by the physical thickness of the substrate material itself, said thickness functioning to allow for a parallax effect;
    (b) a posterior grid pattern layer having a posterior grid pattern therein containing opaque or partially opaque regions within said posterior pattern, said posterior grid pattern layer superposed on the lower surface of the primary substrate layer; and
    (c) an anterior grid pattern layer having an anterior grid pattern therein containing transparent or partially transparent regions within said anterior pattern, said anterior grid pattern layer superposed on the upper surface of the primary substrate layer.

11. The cosmetic lens of claim 10 wherein at least one of the grid pattern layers comprise opaque colored regions.

12. The cosmetic lens of claim 10 wherein the anterior grid pattern layer positioned on the upper surface has its grid pattern comprising a patterned array of lenslets which image the grid pattern layer(s) positioned beneath it thereby providing a three-dimensional effect.

13. The cosmetic lens of claim 10 wherein the posterior grid pattern layer positioned on the lower surface has its grid pattern comprising a patterned array of lenslets which reflect the grid pattern layer(s) positioned above.

14. A contact lens comprising in the area thereof circumscribing the visual region:
    a. a first grid pattern containing opaque or partially opaque regions therein;
    b. a second grid pattern superimposed over the first grid pattern and containing opaque or partially opaque regions and transparent or partially transparent regions therein;
    c. a primary substrate layer having an upper surface and a lower surface;
wherein the first and second grid patterns visually interact with one another to form a moiré effect.

15. A cosmetic contact lens comprising an anterior grid pattern of solid and open regions upon its front surface, a carrier body with thickness, and a posterior grid pattern upon its back surface which interacts with the anterior grid pattern.

16. A cosmetic contact lens comprising an anterior array of lenslets upon its front surface, a carrier body with thickness, and a posterior grid pattern upon its back surface.

* * * * *